United States Patent
Wei et al.

(10) Patent No.: US 7,847,812 B2
(45) Date of Patent: Dec. 7, 2010

(54) FOCUSING CONTROL METHOD FOR READING/WRITING OPTICAL DISC

(75) Inventors: Tao-Yen Wei, Hsinchu (TW); Chi-Yuan Liu, Hsinchu (TW)

(73) Assignee: Lite-On It Corp., Taipei (TW)

( * ) Notice: Subject to any disclaimer, the term of this patent is extended or adjusted under 35 U.S.C. 154(b) by 1319 days.

(21) Appl. No.: 11/364,163

(22) Filed: Feb. 28, 2006

(65) Prior Publication Data

US 2006/0209645 A1 Sep. 21, 2006

(30) Foreign Application Priority Data

Mar. 16, 2005 (TW) .............................. 94108069 A

(51) Int. Cl.
*B41J 2/435* (2006.01)
*G11B 7/00* (2006.01)

(52) U.S. Cl. ..................... 347/246; 347/236; 369/44.25

(58) Field of Classification Search ................. 347/246, 347/236; 369/44.28, 44.29, 44.25
See application file for complete search history.

(56) References Cited

U.S. PATENT DOCUMENTS 5,914,928 A * 6/1999 Takahashi ................ 369/47.14

| | | | |
|---|---|---|---|
| 2003/0002404 A1* | 1/2003 | Maekawa | 369/44.28 |
| 2003/0035352 A1* | 2/2003 | Worthington | 369/47.35 |
| 2003/0161230 A1* | 8/2003 | Tsai | 369/44.29 |
| 2004/0059987 A1* | 3/2004 | Hung et al. | 714/768 |
| 2004/0141385 A1* | 7/2004 | Pettigrew et al. | 365/200 |
| 2004/0141445 A1* | 7/2004 | Hanks | 369/53.29 |

* cited by examiner

*Primary Examiner*—Stephen D Meier
*Assistant Examiner*—Sarah Al-Hashimi
(74) *Attorney, Agent, or Firm*—Kirton & McConkie; Evan R. Witt

(57) ABSTRACT

A label pattern can be created on a label side of an optical disc under well focus control. An optical disc is first loaded in an optical disc drive with the label side thereof facing to an optical head of the optical disc drive. Then, the optical head is actuated along a focusing direction. Meanwhile, a light intensity addition signal is generated in response to optical signals reflected from the optical disc and received by the optical head. A closed-loop control operation of the optical head is performed according to the light intensity addition signal after the light intensity addition signal up-crosses a threshold. Then, a label pattern can be defined on the label side of the optical disc with the closed-loop control operation.

16 Claims, 5 Drawing Sheets

FOCUSING CONTROL METHOD FOR READING/WRITING OPTICAL DISC

FIELD OF THE INVENTION

The present invention relates to a focusing control method, and more particularly to a focusing control method for use in an optical disc drive to read/write an optical disc.

BACKGROUND OF THE INVENTION

Optical discs such as compact discs (CDs), video compact discs (VCDs) and digital versatile discs (DVDs) are generally used to record data onto a data side thereof with a burner. For convenience, after the burning operation of a disc is finished, the title or other information should be marked on the label side of the disc. An approach for marking the disc utilizes a marking pen to write the information on the disc. If a wrong marking pen is selected, the disc is likely damage because a very thin protective coating on the label side of the disc is vulnerable to chemical or physical attack. In addition, the ink in some kinds of pens may damage the top coating of the disc. In accordance with another approach, an adhesive label is attached onto the label side of a disc. Although the attachment of the adhesive label makes the disc look more professional, there are still some drawbacks. For example, any air bubbles in the adhesive label may cause trouble. If the adhesive label is not perfectly aligned, vibration is likely rendered when the optical disc is rotating in the disc reading apparatus. For reading an unbalanced disc, the rotating speed has to be lowered in order to avoid errors.

A new method for printing the label pattern onto the label side, which is also referred as a light-scribe technology, requires special discs with printable surfaces. The label sides of the discs are coated with a light-sensitive dye that becomes darkened when exposed to the laser light in a specially designed disc burner. After a blank disc is burnt in the usual way, the disc is flipped over and loaded to the burner again. By creating the desired label design on the computer system using a graphics program, the laser light burns the label pattern onto the label side. In comparison with the conventional disc marking method, the light-scribe technology is able to create high-quality label pattern on the disc, for example the effect of serigraphy or grey level.

Typically, the reflectivity of the label side is approximately 10%, which is much lower than the reflectivity of the data side (e.g. approximately 45%). This low reflectivity of the label side has a great influence on the focusing operation of the laser light.

Referring to FIG. 1, a conventional focusing control system of an optical disc drive 100 is shown. An optical disc 110 is driven to rotate by a spindle motor 120. For reading data from the rotating disc, the optical head 10 is driven to move in the tracking direction by a sled motor 130 to perform a seeking operation. Further, the lens 1 of the optical head 10 is driven to move in the tracking direction by a tracking coil 140 to perform a tracking operation. The term "tracking operation" used herein means that the position of the optical head with respect to a selected track is maintained in the proper center position above the selected track. The term "seeking operation" means that the optical head jumps from one track to another track. In addition, the optical head 10 is driven to move in the focusing direction by a focusing coil 145 to perform a focusing operation.

When an electronic signal is generated responsive to an optical signal reflected from the optical disc 110 and received by the optical head 10, the electronic signal is transmitted to a radio frequency (RF) amplifier 150 to be processed into a radio frequency signal RF, a tracking error signal TE and a focusing error signal FE. These signals RF, TE and FE are further processed by a digital signal processor (DSP) 170 to generate three control signals. In response to these three control signals, a first motor driver 160 makes adjustments to output driving forces for driving the sled motor 130, the tracking coil 140 and the focusing coil 145, thereby properly locating the optical head 10 onto the desired track and desired focusing position. Under the control of the digital signal processor 170, a second motor driver 165 outputs a driving force for driving the spindle motor 120, thereby permitting rotation of the disc 110 at a revolving speed.

Please refer to the timing waveforms of FIG. 2($a$), in which the voltage variations Fdv outputted by the first motor driver 160 and the focusing error signal FE change as the lens 1 is moved from bottom to top. Typically, the timing waveform FE is also referred as a focusing S curve. This focusing S curve is advantageous for evaluating the timing of enabling the closed-loop control operation. After the focusing error signal FE is filtered by a high pass filter, the shifted focusing error signal FE is shown. For example, when the amplitude of the shifted focusing error signal FE is greater than a specific value Fon and then drops down to a first reference value Fr, the digital signal processor 170 starts a closed-loop control operation so as to result in a sub-beam addition signal SBAD. When the sub-beam addition signal SBAD has up-crossed a threshold T for a predetermined period of time, it is discriminated that the focusing operation is completed.

Referring to FIG. 2($b$), the optical head 10 has three optical sensors. The central optical sensor has four light receiving parts A, B, C and D for respectively receiving the main beam reflected from the disc 110. Whereas, the bilateral optical sensors have four light receiving parts E, F, G and H for respectively receiving the sub-beam reflected from the disc 110. The sub-beam addition signal SBAD is the summation of the overall light intensity received by the receiving parts E, F, G and H, i.e. (E+F+G+H), where E, F, G and H are light intensities received by the regions E, F, G and H, respectively. The focusing error signal FE is substantially a difference between the summation of the overall light intensity received by the receiving parts A and C and the summation of the overall light intensity received by the receiving parts B and D, i.e. (A+C)−(B+D), where A, B, C and D are light intensities received by the regions A, B, C and D, respectively. When the light emitted by the light source is perfectly focused on the desired point, the overall light intensity received by the receiving parts B and D will be equal to that the overall light intensity received by the receiving parts A and C, i.e. FE=(A+C)−(B+D)=0. In another case that the value of (A+C)−(B+D) is minus, a focusing position is above the perfect position. Whereas, the positive value of (A+C)−(B+D) indicates a focusing position below the perfect position.

As previously described, the reflectivity of the label side of the disc 110 is approximately 10%. Due to this low reflectivity, the light intensities received by the receiving parts A, B, C and D are very weak. Since the focusing error signal FE is determined according to the difference between (A+C) and (B+D), the amplitude of the focusing error signal FE or the shifted focusing error signal FE is very low. For enlarging the amplitude of the focusing error signal FE, the gain of the RF amplifier 150 may be increased. However, the noise contained in the focusing error signal FE is also increased as the gain of the RF amplifier 150 is increased. Under this circumstance, since the focusing S curve becomes very smooth, the timing of enabling the closed-loop control operation is evaluated with difficulty or mistake. Such difficulty or mistake is therefore insufficient to provide a good focusing control efficacy and becomes problematic in marking the label side of the disc.

SUMMARY OF THE INVENTION

The present invention provides a focusing control method for evaluating the timing of enabling the closed-loop control operation to correctly realize a focusing condition of an optical head.

A focusing control method is used with an optical disc drive to read/write an optical disc according to an aspect of the present invention. The optical disc drive has an optical head and a control chipset, and the optical disc has a data side and a label side. The focusing control method comprises steps of: loading the optical disc in the optical disc drive with the label side thereof facing to the optical head; actuating the optical head along a focusing direction; generating a light intensity addition signal from the control chipset in response to optical signals reflected from the optical disc and received by the optical head; entering a ready-to-focus state when the light intensity addition signal is greater than a first threshold; and entering a focus-locked state to enable a closed-loop control operation when the light intensity addition signal is greater than a second threshold, wherein the second threshold is greater than the first threshold and the second threshold is smaller than the maximum value of the light intensity addition signal.

The light intensity addition signal is a radio frequency signal or a sub-beam addition signal, for example.

In an embodiment, the first threshold is about $8/26$ of the maximum value of the light intensity addition signal, and the second threshold is about $17/26$ of the maximum value of the light intensity addition signal.

A ready-to-read or ready-to-write state can be entered preferably after the closed-loop control operation has been enabled and the light intensity addition signal has up-crossed a third threshold for a predetermined period of time. The third threshold is smaller than the second threshold but greater than the first threshold, for example about $15/26$ of the maximum value of the light intensity addition signal. In an example, a label pattern can be defined on the label side of the optical disc after entering the ready-to-write state.

Preferably, the optical disc is a specially designed disc supporting the light-scribe technology.

Furthermore, a label pattern can be created on a label side of an optical disc under a focus control method of the present invention. The optical disc is loaded in an optical disc drive with the label side thereof facing to an optical head of the optical disc drive. Then, the optical head is actuated along a focusing direction. Meanwhile, a light intensity addition signal is generated in response to optical signals reflected from the optical disc and received by the optical head. A closed-loop control operation of the optical head is performed according to the light intensity addition signal after the light intensity addition signal up-crosses a threshold. Then, a label pattern can be defined on the label side of the optical disc with the closed-loop control operation. In an embodiment, the closed-loop control operation of the optical head is performed after the light intensity addition signal up-crosses a focus-ready threshold and then a focus-locked threshold.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
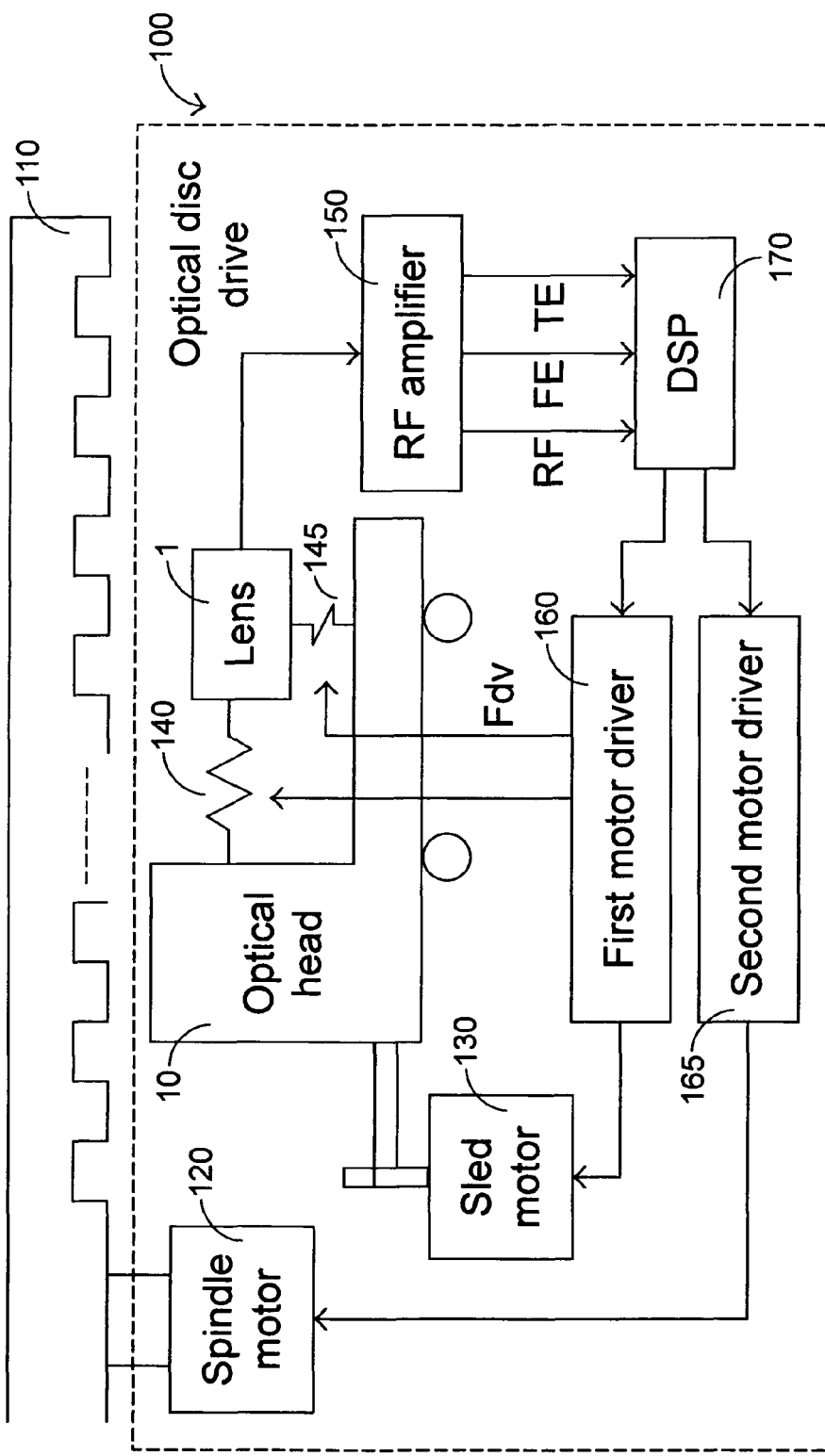
FIG. 1 is a functional block diagram illustrating a conventional focusing control system.
Figure 2A:
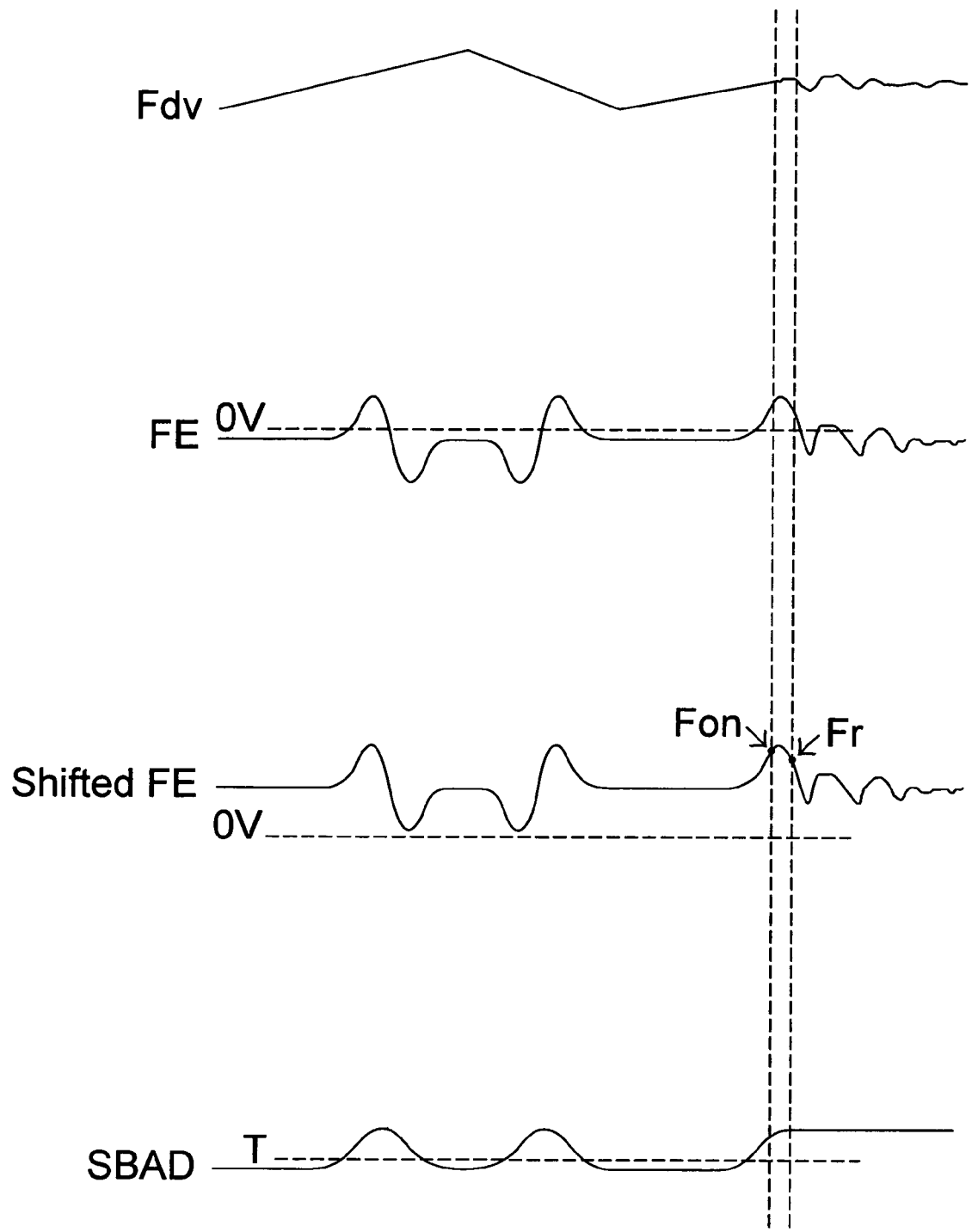
FIG. 2(a) is a timing waveform diagram illustrating the timing when a focusing driving voltage signal Fdv, a focusing error signal FE, a shifted focusing error signal FE and a sub-beam addition signal SBAD are outputted by the focusing control system of FIG. 1, respectively.
Figure 2B:
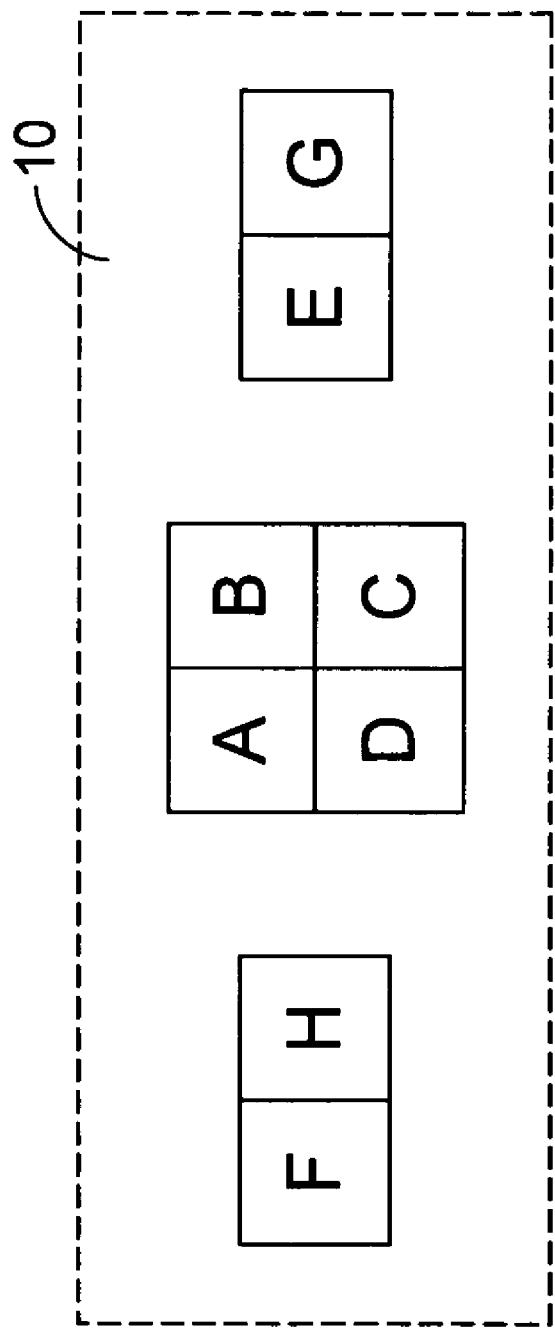
FIG. 2(b) is a diagram schematically illustrating three optical sensors of the optical head consisting of eight receiving parts A, B, C, D, E, F, G and H for receiving a main beam and two sub-beams.
Figure 3:
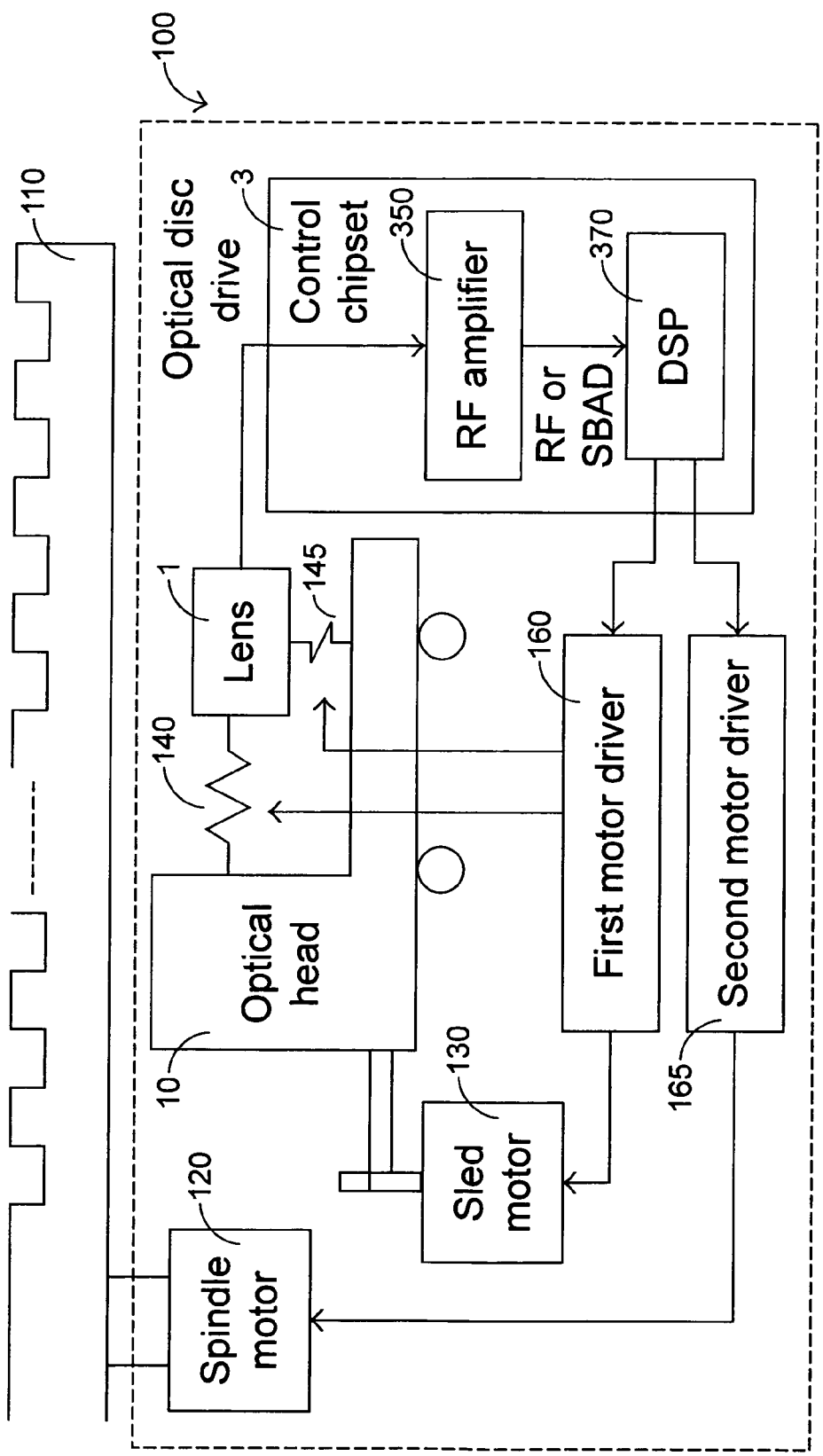
FIG. 3 is a functional block diagram illustrating a focusing control system according to a preferred embodiment of the present invention.

Please refer to FIG. 3. In a focusing control system of the present invention, an optical disc 310 is driven to rotate by a spindle motor 120 with the label side 3100 facing to the optical head 10. For example, the reflectivity of the label side is approximately 10% and the reflectivity of the data side is approximately 45%. When an electronic signal is generated responsive to an optical signal reflected from the label side 3100 of the optical disc 310 and received by the optical head 10, the electronic signal is transmitted to a radio frequency (RF) amplifier 350 of a control chipset 3 to be processed into a radio frequency signal RF and a sub-beam addition signal SBAD in an open-loop focusing control manner. The radio frequency signal RF and a sub-beam addition signal SBAD are further processed by a digital signal processor (DSP) 370 of the control chipset 3 to generate two control signals. In response to either of these two control signals, a first motor driver 160 makes adjustments to output a driving force for driving the focusing coil 145, thereby locating the optical head 10 onto the desired focusing position.

Figure 4:
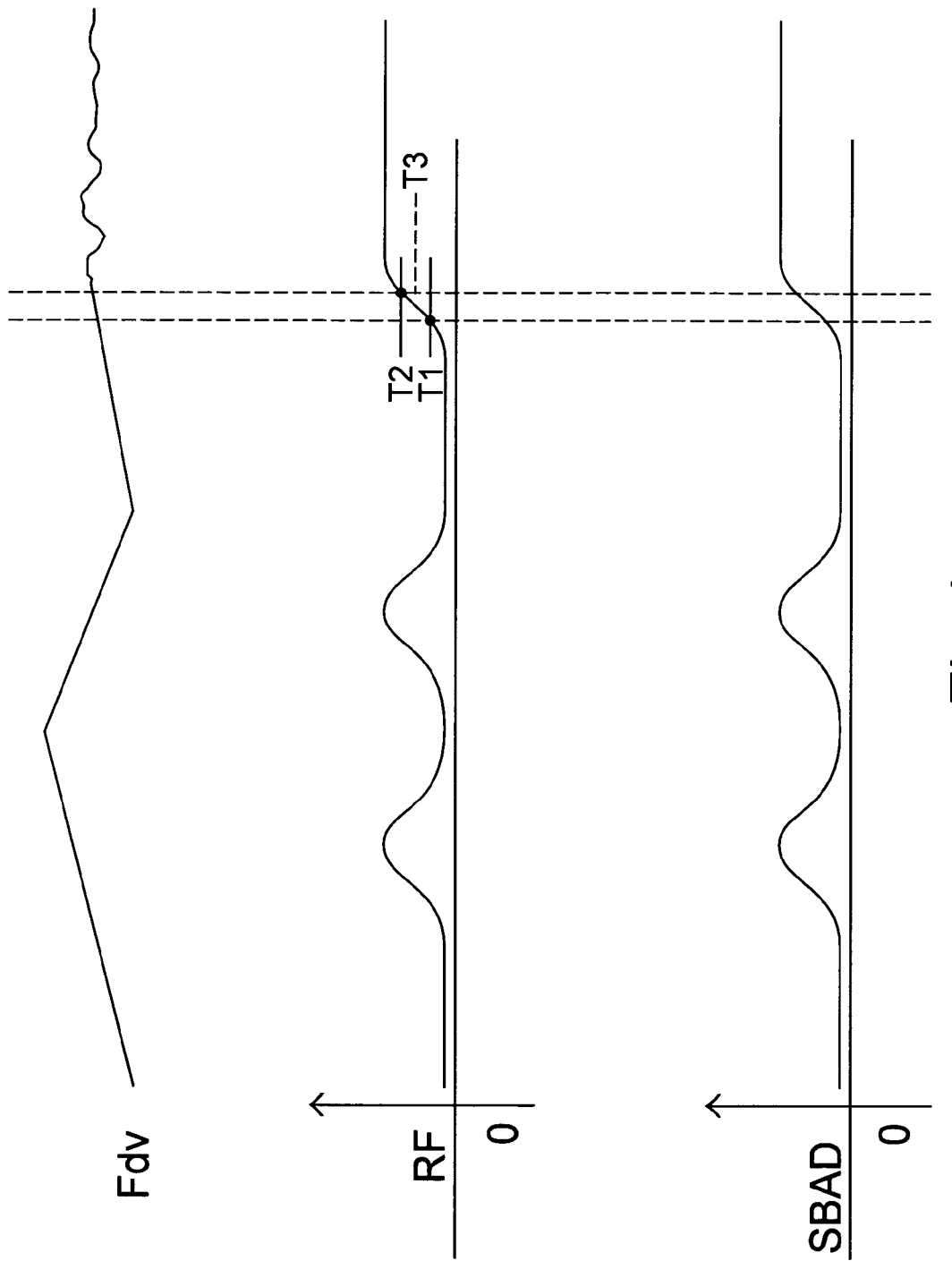
FIG. 4 is a timing waveform diagram illustrating the timing when a focusing driving voltage signal Fdv, a radio frequency signal RF and a sub-beam addition signal SBAD are outputted by the focusing control system of FIG. 3, respectively.

Please refer to the timing waveforms of FIG. 4, which illustrates the timing when the focusing driving voltage signal Fdv outputted by the first motor driver 160 and the radio frequency signal RF and the sub-beam addition signal SBAD outputted by the radio frequency amplifier 350, respectively. The radio frequency signal RF is the summation of the overall light intensity received by the receiving parts A, B, C and D, i.e. (A+B+C+D), where A, B, C and D are light intensities received by the regions E, F, G and H, respectively. The sub-beam addition signal SBAD is the summation of the overall light intensity received by the receiving parts E, F, G and H, i.e. (E+F+G+H), where E, F, G and H are light intensities received by the regions E, F, G and H, respectively. Since the radio frequency signal RF or the sub-beam addition signal SBAD is expressed as a light intensity addition signal, the amplitude thereof is much greater than that of the focusing error signal FE, which is determined according to the difference between (A+C) and (B+D). For example, after the automatic gaining operation by the radio frequency amplifier 350, the maximum value of the radio frequency signal RF or the sub-beam addition signal SBAD is about 2.6 volts. Due to the larger amplitude, the variations of the radio frequency signal RF or the sub-beam addition signal SBAD facilitate evaluating the timing of enabling the closed-loop control operation without difficulty.

As shown in FIG. 4, when the intensity of the radio frequency signal RF or the sub-beam addition signal SBAD is greater than a first threshold or focus-ready threshold T1, a ready-to-focus state is entered. As the signal climbs up and the intensity thereof is greater than a second threshold or focus-locked threshold T2, a focus-locked state is entered to enable a closed-loop control operation. After the closed-loop control operation starts and the radio frequency signal RF or the sub-beam addition signal SBAD has up-crossed a third threshold or focus-done threshold T3 for a predetermined period of time (e.g. 1.5 millisecond), it is determined that a ready-to-read or ready-to-write state can be entered. In a case that the maximum value of the radio frequency signal RF or the sub-beam addition signal SBAD is about 2.6 volts, the first, second and third thresholds are 0.8, 1.7 and 1.5 volts, respectively.

In the above embodiments, the label side of the disc is coated with a light-sensitive dye printable by the laser light. The optical disc drive of the present invention is a CD drive, a VCD drive, a DVD drive or other optical disc drive having a specially designed disc burner supporting the light-scribe technology.

From the above description, due to the relatively greater amplitude than the focusing error signal FE, the radio frequency signal RF or the sub-beam addition signal SBAD is useful for performing the close-loop control operation especially when the laser light is used to burn the label pattern onto the label side of the disc.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A focusing control method for use in an optical disc drive to read/write an optical disc, the optical disc drive having an optical head and a control chipset, the optical disc having a data side and a label side, and the focusing control method comprising steps of:
    loading the optical disc in the optical disc drive with the label side thereof facing to the optical head;
    actuating the optical head along a focusing direction;
    generating a light intensity addition signal from the control chipset in response to optical signals reflected from the optical disc and received by the optical head;
    entering a ready-to-focus state when the light intensity addition signal is greater than a first threshold;
    entering a focus-locked state to enable a closed-loop control operation when the light intensity addition signal is greater than a second threshold, wherein the second threshold is greater than the first threshold and the second threshold is smaller than the maximum value of the light intensity addition signal; and
    entering a ready-to-read or ready-to-write state after the closed-loop control operation has been enabled and the light intensity addition signal has exceeded a third threshold for a predetermined period of time.

2. The focusing control method according to claim 1 wherein the light intensity addition signal is a radio frequency signal.

3. The focusing control method according to claim 1 wherein the light intensity addition signal is a sub-beam addition signal.

4. The focusing control method according to claim 1 wherein the first threshold is about $8/26$ of the maximum value of the light intensity addition signal, and the second threshold is about $17/26$ of the maximum value of the light intensity addition signal.

5. The focusing control method according to claim 1 wherein the third threshold is smaller than the second threshold but greater than the first threshold.

6. The focusing control method according to claim 1 wherein the third threshold is about $15/26$ of the maximum value of the light intensity addition signal.

7. The focusing control method according to claim 1 further comprising a step of defining a label pattern on the label side of the optical disc after the ready-to-write state is entered.

8. The focusing control method according to claim 1 wherein the optical disc is a specially designed disc supporting the light-scribe technology.

9. A method for creating a label pattern on a label side of an optical disc, comprising steps of:
    loading the optical disc in an optical disc drive with the label side thereof facing to an optical head of the optical disc drive;
    actuating the optical head along a focusing direction;
    generating a light intensity addition signal in response to optical signals reflected from the optical disc and received by the optical head;
    performing a closed-loop control operation of the optical head according to the light intensity addition signal after the light intensity addition signal exceeds a threshold;
    entering a ready-to-write state after the closed-loop control operation has been enabled and the light intensity addition signal has exceeded a focus-done threshold for a predetermined period of time; and
    defining a label pattern on the label side of the optical disc with the closed-loop control operation.

10. The method according to claim 9 wherein the closed-loop control operation of the optical head is performed after the light intensity addition signal exceeds a focus-ready threshold and then a focus-locked threshold.

11. The method according to claim 10 wherein the focus-ready threshold is about $8/26$ of the maximum value of the light intensity addition signal, and the focus-locked threshold is about $17/26$ of the maximum value of the light intensity addition signal.

12. The method according to claim 9 wherein the focus-done threshold is smaller than the focus-locked threshold but greater than the focus-ready threshold.

13. The method according to claim 9 wherein the focus-done threshold is about $15/26$ of the maximum value of the light intensity addition signal.

14. The method according to claim 9 wherein the light intensity addition signal is a radio frequency signal.

15. The method according to claim 9 wherein the light intensity addition signal is a sub-beam addition signal.

16. The method according to claim 9 wherein the optical disc is a specially designed disc supporting the light-scribe technology.

* * * * *